United States Patent [19]

Heidel et al.

[11] Patent Number: 5,180,800
[45] Date of Patent: * Jan. 19, 1993

[54] PROCESS FOR THE PREPARATION OF FINELY DIVIDED, WATER-SWELLABLE POLYSACCHARIDE GRAFT POLYMERS

[75] Inventors: Klaus Heidel, Marl; Frank Krause, Kleve; Peter Hofmann, Marl, all of Fed. Rep. of Germany

[73] Assignee: Starchem GmbH, Krefeld, Fed. Rep. of Germany

[ * ] Notice: The portion of the term of this patent subsequent to Jul. 16, 2008 has been disclaimed.

[21] Appl. No.: 695,223

[22] Filed: May 3, 1991

[30] Foreign Application Priority Data

May 8, 1990 [DE] Fed. Rep. of Germany ....... 4014628

[51] Int. Cl.$^5$ ...................... C08F 251/00; C08F 2/32; C08B 31/00; C08B 15/00
[52] U.S. Cl. ................................. 527/300; 527/312; 527/313; 527/314; 527/315
[58] Field of Search ............... 527/300, 312, 313, 314, 527/315

[56] References Cited

U.S. PATENT DOCUMENTS

| | | | |
|---|---|---|---|
| 4,131,576 | 12/1978 | Iovine et al. | 527/315 |
| 4,229,326 | 10/1980 | Morin et al. | 527/315 |
| 4,375,535 | 3/1983 | Kightlinger et al. | 527/314 |
| 4,705,825 | 11/1987 | Symes et al. | 527/314 |
| 4,777,232 | 10/1988 | Heidel | 527/313 |
| 4,833,201 | 5/1989 | Starzewski et al. | 527/313 |
| 5,032,659 | 7/1991 | Heidel | 527/314 |

OTHER PUBLICATIONS

Billmeyer, Jr. "Textbook of Polymer Science", John Wiley & Sons, 1984, pp. 126–127.

Primary Examiner—Nathan M. Nutter
Attorney, Agent, or Firm—Oblon, Spivak, McClelland, Maier & Neustadt

[57] ABSTRACT

Finely divided polysaccharide graft polymers having a high absorption capacity for urine and water are prepared by semi-continuous reverse-phase suspension polymerization, in which an aqueous solution of an unsaturated carboxylic acid and an initiator is metered continuously into a suspension of a polysaccharide in an organic solvent and the polymer obtained is subsequently partial dehydrated and the crosslinked.

15 Claims, No Drawings

PROCESS FOR THE PREPARATION OF FINELY DIVIDED, WATER-SWELLABLE POLYSACCHARIDE GRAFT POLYMERS

BACKGROUND OF THE INVENTION

1. Field of the Invention

The present invention relates to a process for the preparation of finely divided, porous and rapidly water swellable polysaccharide graft polymers. These polymers are prepared by semi-continuous reverse-phase suspension polymerization, partial dehydration and post-crosslinking.

2. Description of the Background

Water-absorbing polymers are in diverse use in the sanitary and hygiene sectors as water absorbents in paper napkins and paper towels, as tampons, patient undersheets and electrolyte thickeners in dry batteries, as moisture-retaining agents or water-storing agents in agriculture and as desiccants.

Suitable polymers are polysaccharide derivatives to which are usually grafted water-soluble vinyl monomers. Such polymers include carboxymethylcellulose, hydrolysed starch/acrylonitrile graft polymers, acrylic acid/starch graft polymers or fully synthetic, weakly crosslinked polymers such as partially crosslinked polyacrylic acid salts and partially crosslinked polymaleic acid derivatives.

A process for the preparation of resins having a high water absorption capacity is described in DE-C-26 12 846. In this process starch is also polymerized with acrylic acid and a crosslinking agent in aqueous or aqueous alcoholic solution. With solids contents of usually below 20%, however, rubber-like block gels are formed in this precipitation polymerization, from which the pulverulent end products are obtained only after drying and grinding.

According to Japanese Patent 80/139 408, a graft polymer can be prepared which can subsequently be hydrolysed and crosslinked by polymerization of acrylonitrile in an aqueous medium in the presence of starch. A powder having a water-absorption capacity of 150 to 180 ml/g is obtained.

A graft polymerization in suspension is taught in Japanese Patent 80/161 813. In this process a mixture of n-hexane with sorbitan monostearate, starch, water, acrylic acid, sodium hydroxide solution and water-soluble initiator is first prepared, before the polymerization is initiated by heating. However, in this case the reaction product tends to agglomerate during the polymerization and is not obtained in finely divided form.

According to DE-C-28 40 010 cationic, water-soluble polysaccharide graft polymers can be prepared by inverse suspension polymerization. In this process a polysaccharide is first suspended in the presence of a surface-active agent in a water-immiscible solvent. An aqueous monomer solution, which predominantly contains acrylamide and which can also contain acrylic acid in small amounts, is then added at room temperature. After addition of an initiator, the mixture is heated and polymerized. The solids content, based on the aqueous polymer mixture, is more than 50%. In this case no crosslinking agents are employed and the water-swellable gel-like polymers are not obtained. The batch-wise preparation process indicated leads, at the start of the polymerization, to temperature peaks which are difficult to control in the case of large batches.

In EP-B-O 083 022 acrylic acid is polymerized in the presence of starch in aqueous solution. The products can then be crosslinked in an inert solvent in the presence of 0.01 to 1.3 parts of water per part of resin. The preparation of the starch graft polymers is effected at a solids content of only 20%. Moreover, these starch graft polymers—crosslinked and non-crosslinked—have only a low water-absorption capacity.

DE-A-38 01 633 shows the preparation of polysaccharide graft polymers by inverse suspension polymerization, partial dehydration and crosslinking. The inverse suspension polymerization is, however, carried out in a single stage and discontinuously, by first adding together all reactants and then initiating the polymerization by heating in the presence of an initiator. With this process heat is instantaneously liberated at the start of the polymerization. In industrial production reactors a sufficiently rapid removal of the heat of polymerization can frequently be ensured only with difficulty. A need therefore continues to exist for a method of preparing polysaccharide graft polymers of good water absorptivity.

SUMMARY OF THE INVENTION

Accordingly, one object of the present invention is to provide a process for the preparation of finely divided polysaccharide graft polymers which provides products having a very good water-absorption capacity and which at the same time can be carried out well on pilot plant and production scales. In particular, it should be possible to reliably remove the heat of polymerization.

Accordingly, these and other objects of the present invention as hereinafter will become more readily apparent can be attained in a method for the preparation of finely divided, porous and rapidly water-swellable polysaccharide graft polymer by adding an aqueous solution, which contains 60 to 95 parts of a 50 to 100 per cent neutralized olefinically unsaturated carboxylic acid, 0 to 50 parts of other olefinically unsaturated monomers, 0 to 2 parts of crosslinking agent and 0.005 to 5 parts of polymerization initiator, continuously at 40° to 100° C. over 0.5 to 5 hours to a suspension of 5 to 40 parts of polysaccharide and 0 to 2 parts of polymerization initiator in a nonpolar organic solvent which contains a dispersing agent mixture consisting of (a) 50 to 100 per cent by weight of nonionic surfactant having a hydrophilic/lipophilic balance of 0.5 to 10 and (b) 0 to 50 per cent by weight of nonionic surfactant having a hydrophilic/lipophilic balance of 10.5 to 20 and thereby conducting semi-continuous reverse phase polymerization;

partially dehydrating the polymer product obtained in the polymerization step; and then cross-linking the partially dehydrated polymer.

DETAILED DESCRIPTION OF THE PREFERRED EMBODIMENTS

It has been surprisingly found that a premixing of the reactants is not necessary for a virtually complete reaction of polysaccharide and unsaturated carboxylic acid and that it is possible to meter in the unsaturated carboxylic acid only during the graft polymerization.

Suitable polysaccharides which can be used in the process include starches, starch derivatives and cellulose derivatives. Natural starches obtained from potatoes, maize, wheat, rice and tapioca roots and also wax maize or high amylose starch and their derivatives, such as, for example, starch ethers and starch esters, can be employed. Starches which are of low viscosity on boiling and which usually slightly degrade upon hydrolysis or oxidation are particularly suitable. Starches having a viscosity of 20 to 25,000 mPa.s, measured on a 10% paste at 20° C, are preferred; viscosities of 40 to 500 mPa.s being particularly preferred.

Preferably, 10 to 25 parts of starch are suspended in the organic solvent.

The solvents employed for the organic phase of the reaction include hydrocarbons having 6 to 12 C atoms. Aliphatic or alicyclic hydrocarbons such as cyclohexane, n-hexane, $C_8$-isoparaffins or industrial benzine fractions, such as normal benzine, ligroin, test benzine or solvent naphtha, having an aromatic content of up to 20% and a boiling point in the range from 50° to 200° C. can be used.

Lipophilic sorbitan esters such as, for example, sorbitan monolaurate, sorbitan monopalmitate and sorbitan monooleate, are preferably employed in the reaction as the nonionic surfactant having an HLB value of 0.5 to 10, which should be at least partially soluble in the organic solvent. In addition, polyether esters, such as polyethylene glycol(200) monooleate, polyethylene glycol(200) monolaurate and polyethylene glycol(300) oleate are also very suitable.

The co-use of a predominantly water-soluble, nonionic dispersing agent having an HLB value of 10.5 to 20 is advantageous. Substances of this type are, for example, water-soluble polyethylene glycols having a molecular weight of 200 to 20,000, in particular of 400 to 5,000, and also polyethylene glycol ethers obtained from an aliphatic monohydric alcohol having 6 to 20 C atoms and a polyethylene glycol having 3 to 30, in particular 4 to 20, ethylene oxide units. Commercially available $C_{12}$ fatty alcohol polyglycol ethers having 7 to 19 ethylene oxide units and an HLB value of 13 to 18 are also suitable. Polyoxyethylene sorbitan fatty acid esters, such as, for example, polyoxyethylene sorbitan monolaurate and polyoxyethylene sorbitan monooleate are also suitable.

In a preferred embodiment, the dispersing agent mixture consists of 50 to 90 per cent by weight of nonionic surfactant having an HLB value of 4 to 10 and of 10 to 50 per cent by weight of nonionic surfactant having an HLB value of 12 to 18.

The proportion of the dispersing agent mixture is 1 to 10 per cent by weight, preferably 2 to 5 per cent by weight, based on the weight of the olefinically unsaturated carboxylic acid.

The olefinically unsaturated carboxylic acids have 3 to 10 carbon atoms. Examples of these acids include acrylic acid, methacrylic acid, crotonic acid, tiglic acid and angelic acid. Acrylic acid and methacrylic acid are preferably employed. The acids can be neutralized or partially neutralized with alkali metal hydroxide or ammonium hydroxide solutions. Sodium hydroxide solution is preferably employed. The aqueous solutions of the unsaturated carboxylic acids usually have a solids content in the range from 20 to 45%. Preferably, 75 to 90 parts of unsaturated carboxylic acid are employed.

In addition to the unsaturated carboxylic acids, other, olefinically unsaturated monomers such as acrylamide, methacrylamide, the Na salt of 2-acrylamide-2-methylpropanesulfonic acid, 2-methacryloylethanesulfonic acid, 2-hydroxyethyl acrylate, 2-hydroxyethyl methacrylate, N,N-dimethylaminoethyl acrylate and N,N-dimethylaminoethyl methacrylate and its quaternary ammonium salts in the form of an aqueous solution thereof can be used for the polymerization.

The aqueous solution which is added for the polymerization of the polysaccharide suspension initially introduced can also contain completely or predominantly water soluble crosslinking agents. Suitable crosslinking agents include vinyl compounds such as N,N-methylene-bis-acrylamide, butanediol 1,4-di(meth)acrylate, ethanediol di(meth)acrylate, diallylmaleinate, glycidyl(meth)acrylate, allyl methacrylate, polyethylene glycol(450) dimethacrylate, and polyepoxides such as, for example, ethylene glycol diglycidyl ether, polyethylene glycol diglycidyl ether, glycerol triglycidyl ether, diglycerol tetraglycidyl ether, and the like. Preferably, however, only a post-crosslinking reaction is carried out and no crosslinking agents are added to the aqueous solution in the polymerization step.

Customary polymerization initiators are used for the graft polymerization reaction. Suitable initiators include, for example, ammonium peroxodisulfate, sodium peroxodisulfate and potassium peroxodisulfate and the corresponding peroxomonosulfates, dibenzoyl peroxide, dilauroyl peroxide, di-2-ethylhexyl peroxodicarbonate, dicyclohexyl peroxodicarbonate, tert.-butyl perpivalate, tert.-butyl perbenzoate, tert.-butyl permaleinate, tert.-butyl hydroperoxide, di-tert.-butyl peroxide, hydrogen peroxide and also redox catalysts, suitable reducing components being ascorbic acid, sodium methylsulfinate, disodium sulfite and sodium hydrogen sulfite. Azo initiators such as azo-bis-isobutyronitrile, 2,2-azo-bis-(2-amidinopropane) dihydrochloride, 2,2'-azo-bis-(4-cyanopentanecarboxylic acid) and 2-carbamoylazoisobutyronitrile are also suitable.

The initiators can be added to the polysaccharide suspension in the solution of the unsaturated carboxylic acid. However, they can also be metered in as a separate aqueous solution. It is also possible initially to introduce a portion of the initiator in the organic phase and to add another portion with the aqueous solution of the unsaturated carboxylic acid. Preferably, 0.03 to 0.5 part of initiator is initially introduced into the organic phase and 0.05 to 1.5 parts of initiator are metered in an aqueous solution.

The potassium peroxodisulfate and ammonium peroxodisulfate are preferably employed.

Polysaccharide suspensions and aqueous solutions can, in addition, contain customary auxiliaries and additives, such as anti-foams and complexing agents. Thus, for example, nitrilotriacetate, ethylenediamine tetraacetate and diethylenetriamine pentaacetate can be added in order to complex traces of iron.

The polymerization is preferably carried out at 50° to 75° C.

In the case of the reverse-phase suspension polymerization an aqueous polymer mixture is obtained which preferably has a solids content of 30 to 50%, based on the sum of polymer and water.

After the polymerization is complete, a partial dehydration is carried out, the residual water content preferably being adjusted to 5 to 30%, based on the sum of polymer and water. The partial dehydration is generally carried out at 50° to 100° C. by azeotropic distillation, during which vacuum can also be applied. Conventional dehydration equipment, with which the organic phase is recycled, can also be used.

After the partial dehydration, preferably 0.005 to 5 per cent by weight of crosslinking agent, based on the graft polymer, are added. Preferably, the content is 0.05 to 0.5 per cent by weight, epoxides being preferred. Suitable compounds include, inter alia, polyglycidyl ethers such as, for example, ethylene glycol diglycidyl ether, polyethylene glycol diglycidyl ether, glycerol triglycidyl ether and diglycerol tetraglycidyl ether. In addition, polyaldehydes, such as glyoxal or haloepoxy compounds such as epichlorohydrin, can also be used. These crosslinking agents are appropriately added in aqueous or organic solution. The post-crosslinking takes place by heating to 50° to 100° C., heating preferably being to 60° to 80° C. The crosslinking reaction is complete after 0.5 to 4 hours.

After the crosslinking, the starch graft polymers are obtained in the form of pulverulent, porous grains which are composed of extremely finely divided primary particles and have good flow properties. The grains can easily be separated from the continuous organic phase, for example by filtration or centrifugation. Subsequently, they can be dried by conventional processes, for example under vacuum or using a fluidized bed, tumble or paddle drier, to give a pulverulent product. The filtrate can be re-used in the subsequent polymerization batch. Solvent and water can also be separated from the polymer powder by distillation.

The polymerization leads to a uniformly fine product having a narrow particle size distribution and a high absorption capacity for water and body fluids.

The products having particle sizes of below 2 mm are understood to be finely divided in the sense of this invention, and more than 85 per cent by weight of the products should have particle sizes of below 1,000 μm.

The formation of coarse particle agglomerates and caking is very slight.

The products are particularly suitable for incorporation in cellulose-containing, absorbent hygiene articles, such as disposable napkins, sanitary towels, dishcloths and patient undersheets. They can be used as desiccants, as swelling agents in sealing compositions, as thickening agents and as water-storing agents and as moisture-retaining agents in agriculture.

Since the unsaturated monomers metered in are polymerized immediately, the evolution of heat during the polymerization can be monitored and controlled very well. In the case of continuous addition, heat is generated continually and can be readily removed. Temperature peaks do not occur. The semi-continuous reverse-phase suspension polymerization process according to the invention can therefore be carried out without any great difficulties even on a production scale.

The process is generally carried out by dispersing the polysaccharide in the organic solvent, with stirring, in a stirred vessel and heating the dispersion to the desired polymerization temperature. An aqueous solution containing the unsaturated carboxylic acid and the polymerization initiator is then metered in, a polymerization with grafting taking place. After the polymerization, partial dehydration is carried out by azeotropic distillation on a water separator. A post-crosslinking is then carried out and the polymer can then be separated as a finely divided product.

Having now generally described this invention, a further understanding can be obtained by reference to certain specific examples which are provided herein for purposes of illustration only and are not intended to be limiting unless otherwise specified.

FLUID RETENTIVITY

In a 100 ml centrifuge flask, 70 ml of distilled water are added to 0.050 g of polymer, or 70 ml of synthetic urine which is a mixture of 3,883 g of distilled water, 33.2 g of NaCl, 4.0 g of $MgSO_4 \cdot 7H_2O$, 2.4 g of $CaCl_2$ and 77.6 g of urea is added to 0.500 g of polymer, and the polymer is swollen for one hour, with gentle stirring. The gel phase is then repeated from the sol phase for 0.5 hour at 4,500 rpm by centrifugation and weighed.

$$\text{Absorption capacity} = \frac{\text{weight of gel} - \text{sample weight}}{\text{sample weight}} \; (g/g)$$

ABSORBENCY

A 0.05 g amount of polymer, when distilled water is used or 0.100 g of polymer, when synthetic urine is used, is scattered on a glass frit (type G3, diameter 3 cm) which is connected to a fluid-filled burette, the level of which is adjusted to that of the glass frit. The amount of fluid absorbed is measured on the burette after 0.5 and 5 minutes.

$$\text{Absorbency} = \frac{\text{amount of fluid absorbed}}{\text{sample weight}} \; (g/g)$$

The yield in g indicated in the examples always relates to products which have been dried for 24 hours at 50° C. in a vacuum drying cabinet (15 mbar vacuum) to a residual moisture content of 7 per cent by weight. The viscosities indicated relate to 10 per cent aqueous pastes at 20° C.

EXAMPLE 1

A 2,400 ml amount of cyclohexane is initially introduced into a 4 l glass reactor, fitted with a stirrer, a nitrogen inlet, a metering device and a water separator, and heated to 68° C.

| | |
|---|---|
| 75 g | of natural maize starch, |
| 4 g | of sorbitan monolaurate (SPANR ® 20 from Atlas, Wilmington, Del., USA), |
| 0.25 g | of potassium peroxodisulfate in 30 ml of water and |
| 50 mg | of ethylenediamine tetraacetate (Na salt) | are dispersed therein, with stirring (500 rpm). Oxygen is then driven off with nitrogen, after which a monomer solution consisting of

| | |
|---|---|
| 312 g | of acrylic acid, |
| 480 g | of 25% NaOH, |
| 10 g | of sorbitan monolaurate, |
| 0.1 g | of trimethylolpropane triacrylate and |
| 0.5 g | of ammonium peroxodisulfate in 20 ml of water | is metered in over the course of 45 minutes. The mixture is stirred for a further half-hour. 280 ml of water are then removed by azeotropic distillation at 75° C., after which 0.3 g of ethylene glycol diglycidyl ether in 5 ml of water is added at 70° C. The mixture is stirred for a further 2 hours, after which a pulverulent product is removed by filtration.

Yield: 417 g of product.

The particle size distribution determined by sieve analysis and also the absorption characteristics can be seen from Table 1. Polarographic recordings show that 16% of the starch fraction is homogeneously incorporated in the end product.

EXAMPLE 2

In the apparatus of Example 1, 44 g of starch, which has a low viscosity on boiling and which has a viscosity of 127 mPa.s (AMISOL® 05515 from Cerestar, D-4150 Krefeld),

| | |
|---|---|
| 12 g | of sorbitan monolaurate, |
| 4 g | of polyethylene glycol having a molar mass of 1 550 (POLYDIOL 1550 from Hüls AG, D-4370 Marl 1), |
| 50 mg | of ethylenediamine tetraacetate and |
| 0.3 g | of ammonium peroxodisulfate in 12 ml of water | are dispersed in 1,800 ml of cyclohexane, with stirring, at 68° C. An aqueous solution consisting of

| | |
|---|---|
| 258 g | of acrylic acid, |
| 400 g | of 25% NaOH and |
| 0.5 g | of ammonium peroxodisulfate in 20 ml of water | is then metered in continuously over the course of 35 minutes, with stirring.

A 2 g amount of pyrogenic silica (AEROSIL® 2000 C from Degussa AG, D-6000 Frankfurt) are added and 233 ml of water are then removed by azeotropic distillation.

For post-crosslinking, 0.12 g of ethylene glycol diglycidyl ether, dissolved in 5 ml of a water/methyl ethyl ketone mixture (1:1), is added at 70° C., after which the mixture is stirred for a further 2 hours.

Yield: 364 g of product.

A residual monomer content of 31 ppm of unconverted acrylate is determined in the powder. Caking on the stirrer and the wall of the vessel amounts to 21 g.

EXAMPLE 3

In the apparatus from Example 1,

| | |
|---|---|
| 100 g | of starch of low viscosity on boiling from Example 2, |
| 14 g | of sorbitan monolaurate, |
| 4 g | of polyethylene glycol having a molar mass of 1,550, |
| 50 mg | of ethylenediamine tetraacetate, |
| 0.5 g | of potassium peroxodisulfate in 20 ml of water and |
| 200 g | of water | are dispersed in 2,200 ml of cyclohexane, with stirring (400 rpm), and the dispersion is heated to the reflux temperature (68° C.). After flushing with nitrogen, an aqueous solution, prepared from

| | |
|---|---|
| 312 g | of acrylic acid, |
| 480 g | of 25% NaOH and |
| 0.5 g | of ammonium peroxodisulfate in 20 ml of water, | is metered in over the course of 30 minutes.

A 300 ml amount of water is removed by azeotropic distillation. After adding a mixture of 0.2 g of sorbitan triglycidyl ether (DENACOL® 614 B from Nagase Chemicals Ltd., Osaka, Japan) and 0.1 g of ethylene glycol diglycidyl ether in 5 ml of water, the reaction mixture is stirred for a further 2 hours at 70° C.

Yield: 505 g of finely divided polymer powder.

| | |
|---|---|
| Caking on vessel wall and stirrer: | 23 g |
| Residual acrylate content: | 18 ppm |

EXAMPLE 4

In the apparatus from Example 1,

| | |
|---|---|
| 100 g | of starch of low viscosity on boiling from Example 2, |
| 12 g | of sorbitan monolaurate, |
| 4 g | of polyethylene glycol having a molar mass of 1,550, |
| 50 mg | of ethylenediamine tetraacetate and |
| 0.4 g | of ammonium peroxodisulfate in 5 ml of water | are dispersed in 1,800 ml of cyclohexane at room temperature. After flushing with nitrogen, the dispersion is heated to 68° C. and an aqueous solution consisting of

| | |
|---|---|
| 118 g | of acrylic acid, |
| 290 g | of 25% NaOH and |
| 0.4 g | of ammonium peroxodisulfate in 16 ml of water | is then added dropwise over the course of 35 minutes. A 170 ml amount of water is removed by azeotropic distillation. After adding 0.1 g of ethylene glycol diglycidyl ether in 5 ml of water, the reaction mixture is stirred for a further 2 hours at 70° C.

Yield: 260 g of finely divided polymer powder.

| | |
|---|---|
| Caking on vessel wall and stirrer: | 19 g |
| Residual acrylate content: | 38 ppm |

If Example 4 is carried out as a one-step, discontinuous inverse suspension polymerization, in which all reactants are mixed at room temperature and heated, the polymerization starts at 65° C. The temperature rapidly rises to 80° C. Instantaneous cooling is necessary in order to control the polymerization. A lumpy product is obtained, which even after grinding has only a low water-absorption capacity.

The characteristics of the products from Examples 1 to 4 are shown in Table 1 below.

TABLE 1

| Example | Starch content % by weight | Sieve analysis Contents in % by weight | | | Absorption capacity (g/g) | | Absorbency (g/g) | | | |
|---|---|---|---|---|---|---|---|---|---|---|
| | | >800 μ | 500–800 μ | <500 μ | Water | Synthetic urine | Water | | Synthetic urine | |
| | | | | | | | 0.5 min | 5 min | 0.5 min | 5 min |
| 1 | 16 | 12 | 60 | 28 | 320 | 36 | 42 | 110 | 19 | 22 |
| 2 | 12 | 3.5 | 44.5 | 52 | 348 | 36 | 52 | 108 | 17 | 23 |

TABLE 1-continued

| Example | Starch content % by weight | Sieve analysis Contents in % by weight | | | Absorption capacity (g/g) | | Absorbency (g/g) | | | |
|---|---|---|---|---|---|---|---|---|---|---|
| | | >800 μ | 500–800 μ | <500 μ | Water | Synthetic urine | Water 0.5 min | Water 5 min | Synthetic urine 0.5 min | Synthetic urine 5 min |
| 3 | 20 | 4.6 | 85 | 10.4 | 338 | 34 | 52 | 114 | 17 | 23 |
| 4 | 39 | 0.5 | 18 | 81.5 | 280 | 32 | 40 | 104 | 15 | 20 |

EXAMPLES 5 TO 10

The procedure followed is as described in Example 3. However, different polysaccharides are employed. The absorption capacity of the resulting products for synthetic urine can be seen from Table 2.

TABLE 2

| | Example | | | | | |
|---|---|---|---|---|---|---|
| | 5 | 6 | 7 | 8 | 9 | 10 |
| Polysaccharide | Dextrin $M_w$ = 52,000 | Maize starch degraded by oxidation | Maize starch degraded by oxidation | | Maize starch degraded by acid | Maize starch degraded by acid |
| Viscosity (mPa.s) | — | 45 | 370 | 1,500 | 4,400 | 19,000 |
| Carboxyl (%) | — | 0.41 | 0.22 | — | — | — |
| Absorption capacity synth. urine (g/g) | 55 | 44 | 36 | 38 | 34 | 30 |

Having now fully described the invention, it will be apparent to one of ordinary skill in the art that many changes and modifications can be made thereto without departing from the spirit or scope of the invention as set forth herein.

What is claimed as new and desired to be secured by Letter Patent of the United States is:

1. A process for the preparation of finely divided, porous and rapidly water-swellable polysaccharide graft polymers, comprising:
    adding an aqueous solution, which contains 60 to 95 parts of a 50 to 100 per cent neutralized olefinically unsaturated carboxylic acid, 0 to 50 parts of other olefinically unsaturated monomers, 0 to 2 parts of crosslinking agent and 0.005 to 5 parts of polymerization initiator, continuously at 40° to 100° C. over a time of 0.5 to 5 hours to a suspension, in nonpolar organic solvent, of 5 to 40 parts of polysaccharide and 0 to 2 parts of polymerization initiator wherein said nonpolar organic solvent contains a dispersing agent mixture consisting of
    (a) 50 to 100 per cent by weight of nonionic surfactant having a hydrophilic/lipophilic balance of 0.5 to 10 and
    (b) 0 to 50 per cent by weight of nonionic surfactant having a hydrophilic/lipophilic balance of 10.5 to 20 and thereby conducting semi-continuous reverse phase polymerization;
    partially dehydrating the polymer product obtained in the polymerization step; and then
    cross-linking the partially dehydrated polymer in the presence of 0.005 to 5% by weight of crosslinking agent, based on the polymer.

2. The process according to claim 1, wherein the polysaccharide suspended is a starch.

3. The process according to claim 2, wherein 10 to 25 parts of starch are suspended.

4. The process according to claim 1, wherein the organic solvent is an aliphatic or cycloaliphatic hydrocarbon.

5. The process according to claim 1, wherein the dispersing agent mixture consists of
    (a) 50 to 90 per cent by weight of nonionic surfactant having a hydrophilic/lipophilic balance of 4 to 10 and
    (b) 10 to 50 per cent by weight of nonionic surfactant having a hydrophilic/lipophilic balance of 12 to 18.

6. The process according to claim 1, wherein, based on the unsaturated carboxylic acid, 1 to 10 per cent by weight of dispersing agent mixture is employed.

7. The process according to claim 6, wherein from 2 to 5% by weight of dispersing agent mixture is employed.

8. The process according to claim 1, wherein the olefinically unsaturated carboxylic acid is acrylic acid or methacrylic acid.

9. The process according to claim 1, wherein the aqueous solution contains no crosslinking agent.

10. The process according to claim 1, wherein the continuous addition is effected at 50° to 75° C.

11. The process according to claim 1, wherein an aqueous polymer mixture having a solids content of 30 to 50%, based on the sum of polymer and water, is obtained from the suspension polymerization.

12. The process according to claim 1, wherein the partial dehydration is carried out down to a residual water content of 5 to 30%, based on the sum of polymer and water.

13. The process according to claim 1, wherein the polymerization initiator is a peroxide.

14. The process according to claim 1, wherein the polymerization is conducted at 50° to 75° C.

15. The process according to claim 1, wherein the unsaturated acid is acrylic acid, methacrylic acid, crotonic acid, tiglic acid or angelic acid.

* * * * *